US010592447B1

(12) United States Patent
Danilov et al.

(10) Patent No.: US 10,592,447 B1
(45) Date of Patent: Mar. 17, 2020

(54) ACCELERATED DATA HANDLING IN CLOUD DATA STORAGE SYSTEM

(71) Applicant: EMC IP Holding Company LLC, Hopkinton, MA (US)

(72) Inventors: Mikhail Danilov, Saint Petersburg (RU); Aleksandr Rakulenko, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/236,063

(22) Filed: Dec. 28, 2018

(51) Int. Cl.
*G06F 3/00* (2006.01)
*G06F 13/20* (2006.01)
*G06F 12/06* (2006.01)

(52) U.S. Cl.
CPC .......... *G06F 13/20* (2013.01); *G06F 12/0646* (2013.01); *G06F 2212/1041* (2013.01)

(58) Field of Classification Search
CPC ................. G06F 13/20; G06F 12/0646; G06F 2212/1041
See application file for complete search history.

(56) References Cited

U.S. PATENT DOCUMENTS

| | | | | |
|---|---|---|---|---|
| 5,937,169 A | * | 8/1999 | Connery | G06F 13/387 709/250 |
| 6,246,683 B1 | * | 6/2001 | Connery | H04L 49/90 370/392 |
| 2002/0056125 A1 | * | 5/2002 | Hodge | H04N 7/17336 725/87 |
| 2018/0375777 A1 | * | 12/2018 | Ewert | H04L 47/2416 |
| 2019/0042292 A1 | * | 2/2019 | Palermo | G06F 9/45529 |

OTHER PUBLICATIONS

"Azure Accelerated Networking: SmartNICs in the Public Cloud" by Firestone et al. NSDI'18 Proceedings of the 15th USENIX Conference on Networked Systems Design and Implementation pp. 51-64, Renton, WA, USA—Apr. 9-11, 2018 (Year: 2018).*
Netronome Systems, Inc., "Programming NFP with P4 and C," © 2018 Netronome, 9 pages.
www.napatech.com, "Napatech SmartNIC Feature Overview," Retrieved: Feb. 7, 2019, 17 pages.

* cited by examiner

*Primary Examiner* — Jing-Yih Shyu
(74) *Attorney, Agent, or Firm* — Amin, Turocy & Watson, LLP

(57) ABSTRACT

The described technology is generally directed towards accelerating data handling in a cloud data storage system by using smart network interface cards (SmartNICs) at the nodes. Instead of copying data to kernel space, many input/output (I/O) operations can be handled primarily by the SmartNIC, using the SmartNIC's memory. For example, mirrored data writes can be sent directly from the SmartNIC's memory associated with the node handling the write to other nodes, without first copying the data to kernel space. Object reads can be handled at a node by having segments of the object queued, in order, in the node's associated SmartNIC's memory, and sent to a requesting client without having to be copied to the handling node's kernel space, unless low memory conditions exist in the SmartNIC's memory.

20 Claims, 13 Drawing Sheets

ACCELERATED DATA HANDLING IN CLOUD DATA STORAGE SYSTEM

TECHNICAL FIELD

The subject application generally relates to data storage, and, for example, to a data storage system of nodes that uses smart network interface cards to accelerate data handling, and related embodiments.

BACKGROUND

Smart network interface cards (SmartNICs) comprise devices that are programmable network interface cards having processing capability and (volatile) storage capacity. SmartNICs are typically used for data compression/decompression and encryption/decryption. Other use cases for SmartNICs include providing a network-accessible data cache and/or providing a compact key-value store.

In a typical client-server scenario that passes data from a client to a storage backend and back, SmartNICs can improve performance. However, in a cloud data storage system such as DELL EMC ECS (formerly Elastic Cloud Storage), concepts such as mirroring data to multiple nodes to protect the data, and having an object's data distributed among possibly multiple nodes, make performance improvement via the capabilities of SmartNICs a complex problem.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
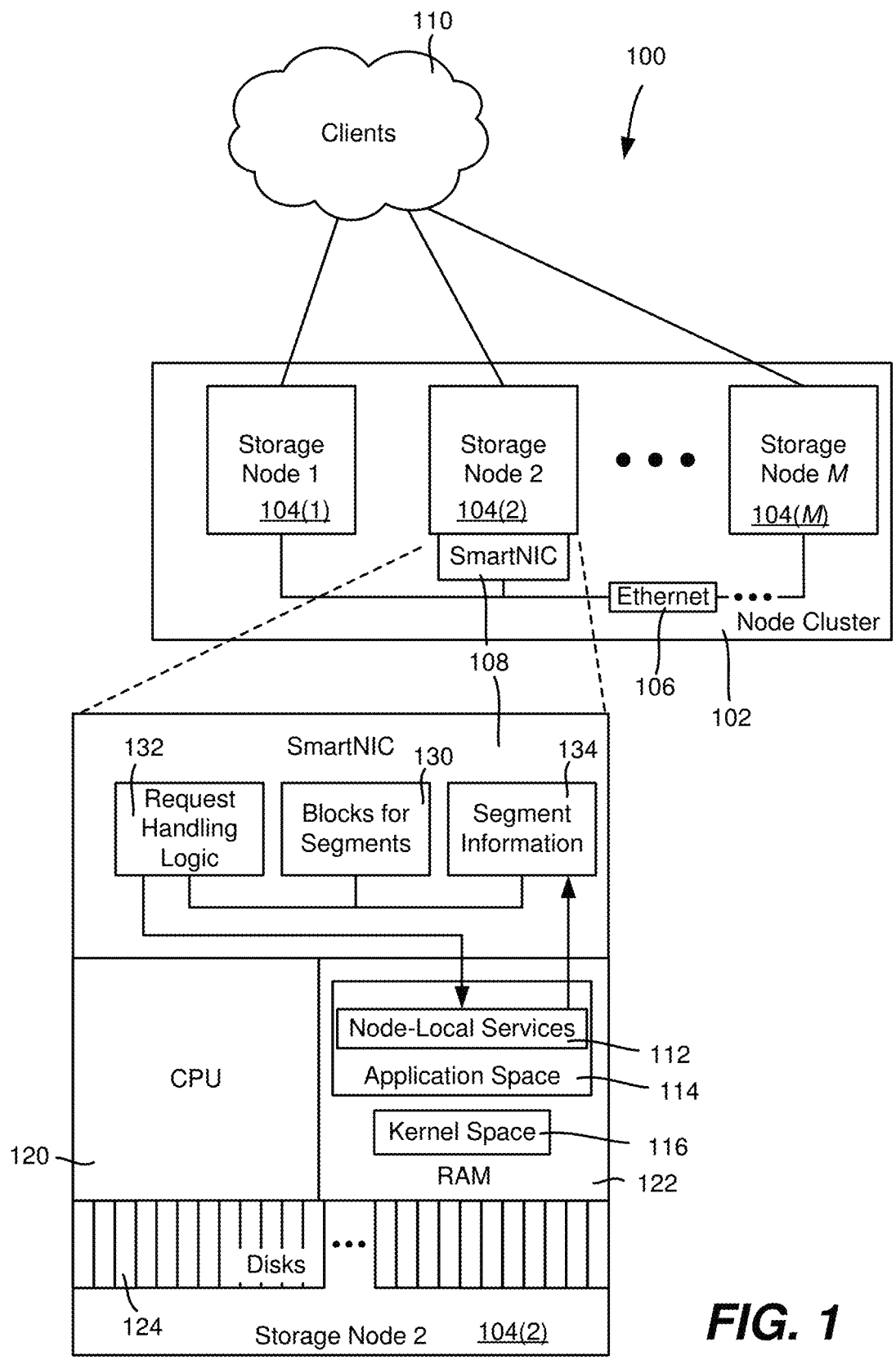
FIG. 1 is an example block diagram representation of part of a cloud data storage system including nodes, in which a smart network interface card (SmartNIC) facilitates data acceleration, according to one or more example implementations.

Various aspects of the technology described herein are generally directed towards accelerating data handling in a cloud data storage system using features of smart network interface cards (SmartNICs), that is, programmable SmartNICs with extra volatile memory (RAM). Significantly, the memory of a SmartNIC can be used to avoid copying the segments to kernel space (as is done in prior systems) whenever possible.

For data writes, a node serves a write request for an object, including dividing the object into segments and storing the segments in a chunk (a data storage unit). The data is protected with mirroring, and thus, a number of (e.g., three) copies of data are stored to storage devices (e.g., disks) of different nodes. The three data copies may go from the SmartNIC memory to remote nodes without ever going to kernel space. Alternatively, two data copies can go from the SmartNIC memory to remote nodes and one data copy can be stored locally, by the node that is serving the write request; although in this scenario one copy of the data goes to local kernel space, the number of overall copying operations is still reduced relative to prior systems.

For data reads, one node serves a client read request for an object. The node reads the object's segments from different chunks stored in different nodes/storage devices. Note that this operation is parallel. The serving node gets the segments, sequences them, and sends the result as a single data portion, e.g., in segment order. In general, the object segments that have not yet been sent to the requesting client are queued in the serving node's SmartNIC's memory (unless and until the memory runs short). This avoids copying the segments to kernel space (as is done in prior systems), to the extent possible.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Further-more, the particular features, structures, or characteristics may be combined in any suitable manner in one or more embodiments/implementations.

As will be understood, the implementation(s) described herein are non-limiting examples, and variations to the technology can be implemented. For instance, examples are based on the ECS data storage system, however the technology described herein can be used by any data storage system that has multiple nodes. Moreover, while segments and chunks are described in the examples, it is understood that any type of data structures communicated among nodes can be accelerated based on the technology described herein. As such, any of the embodiments, aspects, concepts, structures, functionalities, implementations and/or examples described herein are non-limiting, and the technology may be used in various ways that provide benefits and advantages in data storage technology in general.

Aspects of the subject disclosure will now be described more fully hereinafter with reference to the accompanying drawings in which example components and operations are shown, and wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. Thus, the subject disclosure may be embodied in many different forms and should not be construed as limited to the examples set forth herein.

In ECS, disk space is partitioned into a set of blocks of fixed size called chunks. The various types of data, including user data and various types of metadata, are stored in chunks. There are different types of chunks, one type per capacity user. One chunk may (and in most cases does) contain segments of several user objects. One chunk can contain mixed segments of several user objects. In the general case, one user data object is stored as a set of approximately two megabytes segments that reside in several chunks stored to different cluster nodes/disks, with those chunks managed by different cluster nodes. The information about the objects within the cloud data storage system, including their locations, is stored in an object table.

FIG. 1 shows part of a cloud data storage system 100 (such as ECS) comprising a node cluster 102 of storage nodes 104(1)-104(M), in which each node is typically configured primarily to serve objects in response to client requests. The nodes 104(1)-104(M) are coupled to each other via a suitable data communications link comprising interfaces and protocols, such as represented in FIG. 1 by Ethernet block 106. As will be understood, at least one of the cluster nodes has a SmartNIC 108 in order to provide the benefits described herein.

Clients 110 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes instances of data services (node local services 112), which can include or be coupled to an object table so that the node knows the locations of objects (among chunks) in the system. One of the data services handles client I/O (write/read) requests. Note that some data services can be per-cluster, rather than per-node. The data services can be considered part of the node's application space 114; a node also has kernel space 116 that is involved with client request handling, as described herein.

In FIG. 1, a CPU 120 and RAM 122 are shown for completeness; note that the RAM 122 may comprise at least some non-volatile RAM. The node 104 (2) includes storage devices such as disks 124, comprising hard disk drives and/or solid-state drives, or any other suitable type of storage resource.

The technology described herein is based on a programmable SmartNIC 108 with extra volatile memory (RAM); such SmartNICs are commercially available and in use in other applications. The SmartNIC 108 is programmed to work with object segments (on its own or with a help from a driver). In practice, several hundreds of megabytes for segment blocks are sufficient for a node under a moderate load, although as can be readily appreciated, the greater amount of RAM available, the better the results of data acceleration from the technology described herein.

To this end, the extra volatile memory of SmartNICs is divided into blocks 130, e.g., of the standard segment size (approximately two megabytes). In one or more implementations, the blocks are united in a single pool to serve data writes and reads. A block is allocated (e.g., by request handling logic 132) when there is a segment to pass along, and a block is released when a segment for which it was allocated has been successfully passed along.

The technology attempts to store segments in a SmartNIC's memory only, whereby there is no need to copy segments from SmartNIC memory to kernel space and back. One exception is when a segment needs to be moved to kernel space when there is a low memory condition, e.g., there is no free block within a SmartNIC to accommodate the segment. Another exception is when a segment is copied to kernel space because the segment is needed by a local node.

Node-local services manipulate segments received over the network using segments' descriptors. The encapsulation principle is used so services are not aware of an actual location of a segment (SmartNIC's memory of kernel space). As will be understood, based on client I/O requests, the request handling logic 132 in the SmartNIC 108 communicates with the node local services 112 to obtain segment information 134 that the request handling logic 132 uses to determine corresponding chunk location(s) for the read or the write request. A storage system may wrap object segments in system metadata whereby cluster nodes can identify object segments in payload data received, e.g., at a SmartNIC or regular NIC.

With respect to handling data writes, note that object segments come in sequentially in a natural order. Segments of an object thus can automatically form a queue in the memory of a SmartNIC that is connected to the node that is handling the data write request. New segments are added to the queue end, and old segments are deleted from the queue beginning when they are no longer needed. In practice, when system load is moderate, a single data write transaction occupies one to two memory blocks of a SmartNIC.

Figure 2:
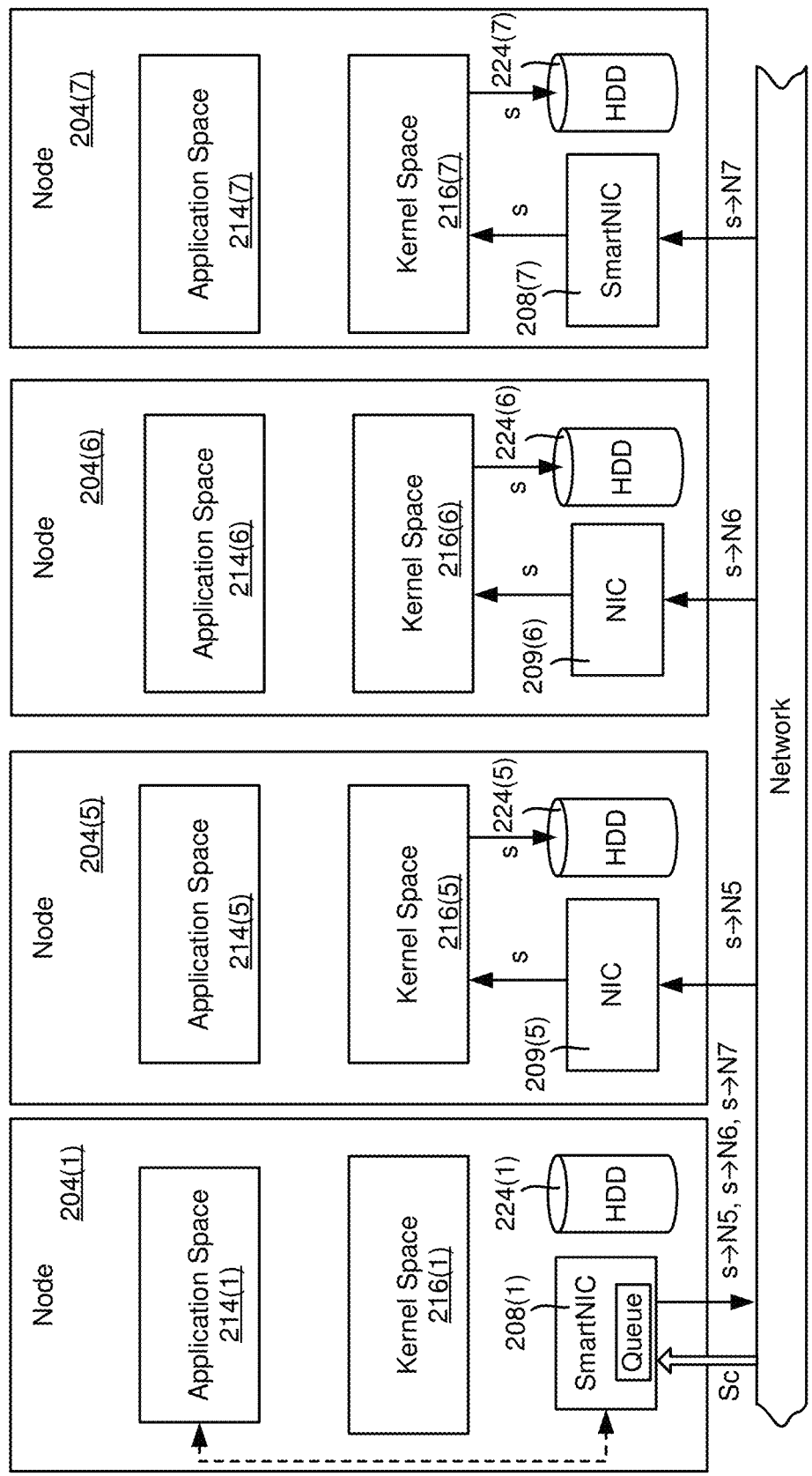
FIG. 2 is an example block diagram representation of handling a data write request in a cloud data storage system using a SmartNIC for data acceleration and zero-copy for local storage, in accordance with various aspects and implementations of the subject disclosure.

As generally represented in FIG. 2, a client segment Sc for a write client is received at a node 204(1) and buffered in the memory of a SmartNIC 208(1). The client request with the client segment Sc has a descriptor that is passed to the storage services (to the application layer 214(1). The storage services find a chunk for the segment and, therefore find the nodes to which a copy of the segment s is to be sent, including nodes for mirroring.

In the example of FIG. 2, the identified nodes for writing the segment s include three remote nodes 204(5)-204(7). With this information, the SmartNIC 208(1) sends a copy of the segment s to the three remote nodes 204(5)-204(7), which transfer the copy to their respective kernel spaces 216(5)-216(7) and then to their respective storage devices (e.g., hard disk drives or HDDs) 224(5)-224(7). Note that the remote nodes 204(5)-204(7) may or may not have a SmartNIC, e.g., the nodes 204(5) and 204(6) have regular NICs 209 while the node 204(7) has a SmartNIC 208(7). In this example significant data acceleration is achieved because the node 204(1) has the SmartNIC 208(1), regardless of the other nodes' capabilities.

More particularly, prior systems first copy the segment from a NIC buffer to the kernel space 216(1), and then back from the kernel space 216(1) one time for each remote node (three times total). In contrast, the technology described herein does not copy the segment to the kernel space in the example of FIG. 2, and thus in this example the use of a SmartNIC as described herein eliminates four (one NIC-to-kernel space plus three kernel space-to-NIC) copy operations between a NIC and kernel space.

Moreover, having a SmartNIC at a remote node can provide further benefits. More particularly, a remote node 204(7) with a SmartNIC 208(7) can detect a difference between data write requests that come from data clients and those that come from a node. Data that comes from a data client is buffered in a SmartNIC as described herein because the final destinations for that data are unknown until the destination information is obtained from the data services. In contrast, data that comes from another node gets stored in the remote node's storage device 224(7), and therefore, such data can be copied to the remote node's kernel space directly, that is, without any buffering.

Figure 3:
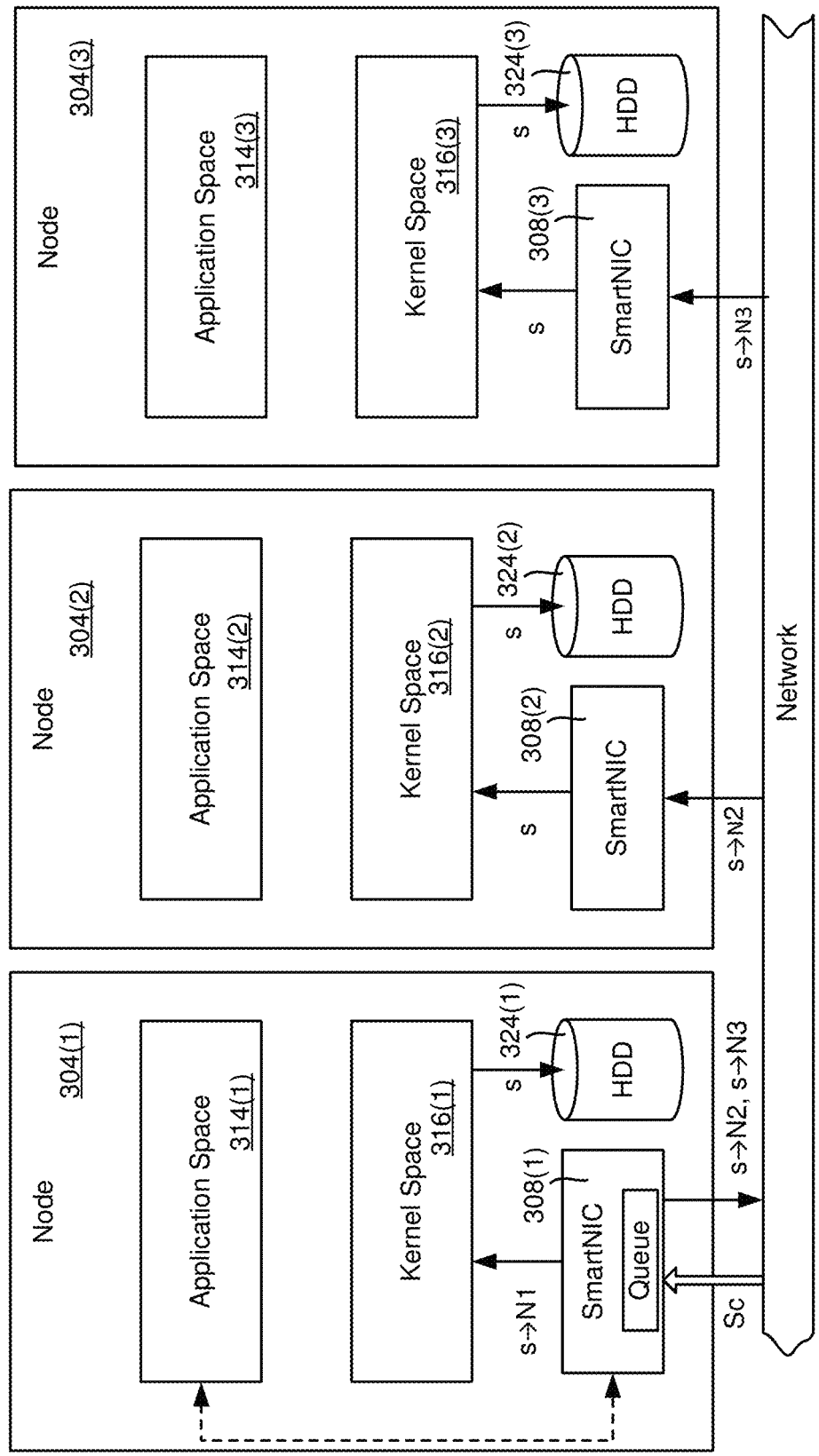
FIG. 3 is an example block diagram representation of handling a data write request in a cloud data storage system using a SmartNIC for data acceleration, in accordance with various aspects and implementations of the subject disclosure.

Turning to another example, consider that the node 304(1) that is handling a write request is also one of the destination nodes for a data segment copy. In the example of FIG. 3, the identified destination nodes for the write segment include the local node 304(1) and two remote nodes 304(2) and 304(3). Note that the copying to the remote nodes 304(2) and 304(3) is the same as described above with reference to FIG. 2 (except note that both remote nodes 304(2) and 304(3) have a SmartNIC 308(2) and 308(3), respectively, so copying to their respective kernel spaces 316(2) and 316(3) and HDDs 324(2) and 324(3) need not involve SmartNIC buffering).

With respect to the local copying operation, because the data services indicates to the SmartNIC 308(1) that its node 304(1) is also a destination node for the data copy, a classic zero-copy technique can be used to pass the data from the SmartNIC 308(1) to the local kernel space 316(1) and thus to a local storage device (HDD) 324(1).

In sum, when the node 304(1) requests nodes 304(2) and 304(3) to store the segment, the node 304(1) sends two separate requests. The segment data is not copied back to the SmartNIC 308(1) each time (as is done in prior systems) because the data is already there; instead the data is sent to the remote nodes directly from the SmartNIC's memory. Therefore, even if the node that is handling the write request is also a destination node for a segment copy, data acceleration is obtained by eliminating two kernel space-to-NIC copy operations when considered relative to prior systems.

Turning to handling data reads, data read handling is non-trivial because object segments can be (and often are) requested from different cluster nodes simultaneously. The order in which segments of one object come to a node that serves a read request is not defined. Therefore, just one object may occupy entire SmartNIC's memory with its segments, even before the first byte of the object data is sent to the client. The technology described herein operates to keep all object segments that have not yet been sent to a client yet in a SmartNIC's memory, unless and until the memory runs short.

Figure 4:
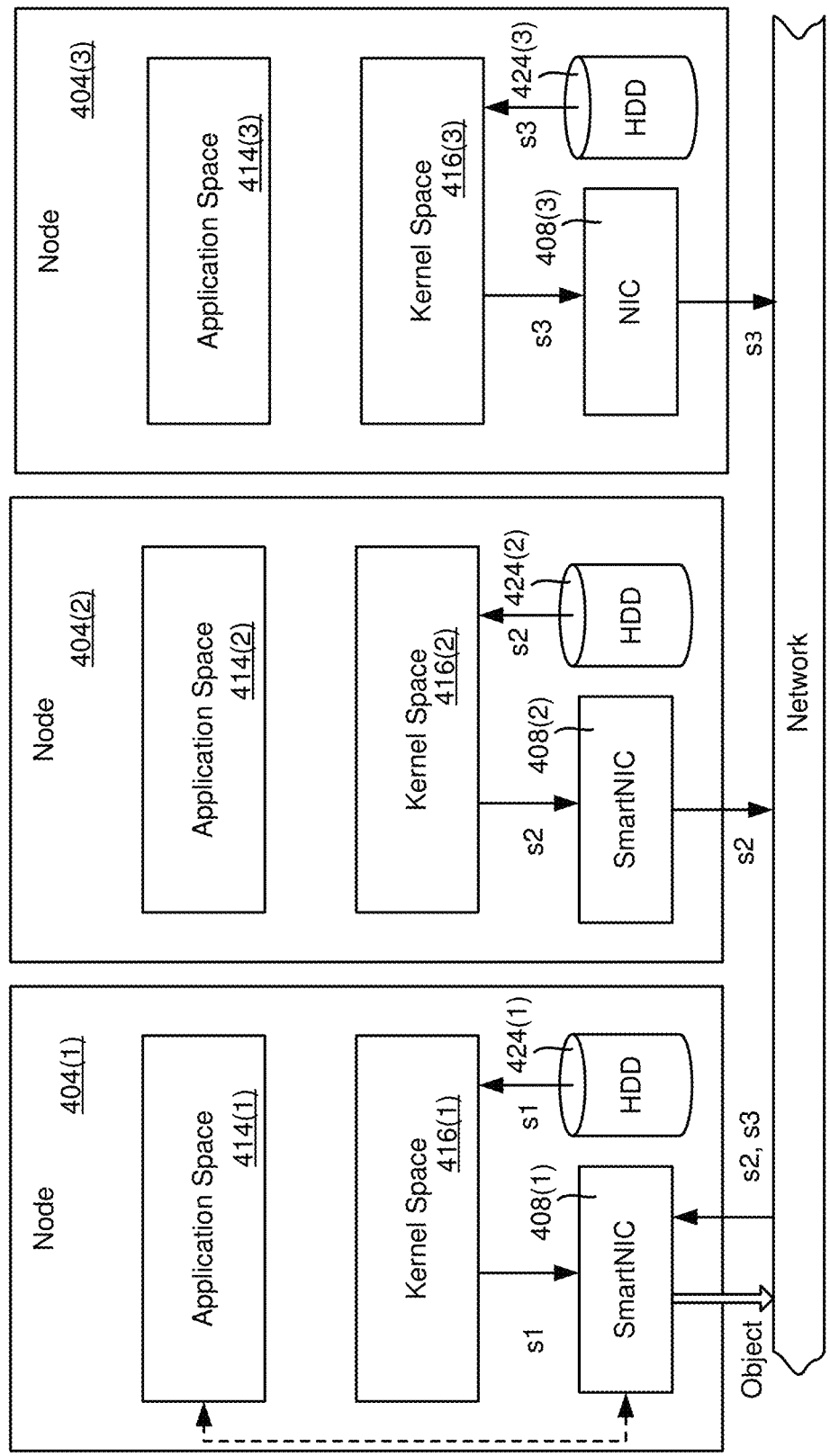
FIG. 4 is an example block diagram representation of handling a data read request in a cloud data storage system using a SmartNIC for data acceleration, in accordance with various aspects and implementations of the subject disclosure.

With respect to data acceleration for read requests in general, in FIG. 4, the Node 404(1) serves a read request for an object that has three segments, s1, s2, and s3. The object segments are stored in the nodes 404(1), 404(2) and 404(3), respectively. Note that the storage services can be used to obtain/manipulate segments using their descriptors as with serving write requests. Thus, the node 404(1) gathers the segments from the different cluster nodes that have them, sorts them according to their associated sequence numbers, and sends the object to a client as a single data portion (meaning the client is unaware of an object's segmentation).

In prior systems, segments s2 and s3 are copied from a regular NIC's memory to the node's kernel space. They are then copied back to the NIC's memory to be sent to a client as the object parts. Note that when all segments are stored in remote nodes, the segments are copied two times between kernel space and a NIC's memory.

In contrast, with the technology described herein, as shown in FIG. 4 the segments s2 and s3 are not copied to or from the kernel space 416(1) at all. Instead, the segments are sent to a client as the parts of the object directly from the memory of the SmartNIC 408(1). Therefore, via a SmartNIC as described herein, data acceleration is achieved relative to prior systems by eliminating up to n*2 (n NIC-to-kernel space and kernel space-to-NIC) copy operations between a conventional NIC and kernel space, where n is the number of segments in an object.

As mentioned above, a SmartNIC can run out of blocks for segments. In order to manage its memory in an efficient way, a SmartNIC needs to know object segments' sequence numbers. For example, a SmartNIC may sort segments of one object to form a queue of segments and thereby determine which segments will be needed shortly and which ones will not be needed shortly. Note that because segments are received in any order, such a queue may have gaps therein, e.g., at a beginning or in a middle of the queue.

A SmartNIC may monitor use of its extra memory. A use threshold value may be defined, e.g., ninety percent, or because blocks have the same size, some number of blocks for that particular SmartNIC. When use of SmartNIC's allocated block memory space exceeds the use threshold value, the SmartNIC may start to move data segments to kernel space. Selection of which segment(s) to move can be based on logic that helps the read operation go efficiently.

Figure 5:
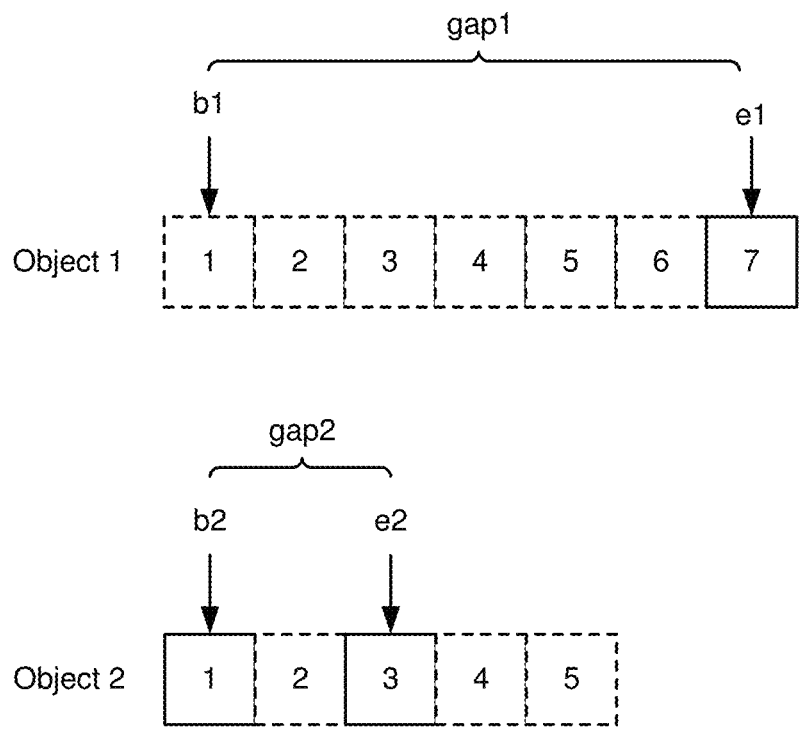
FIG. 5 is an example representation of queues for data object segments, in which the gap from a first segment to a last available segment is used to select a select segment space in a SmartNIC memory queue during a low memory condition, in accordance with various aspects and implementations of the subject disclosure.

By way of example, in FIG. 5 there are two objects for which read requests are being handled by SmartNIC queuing, to the extent possible. In FIG. 5, Object 1 has seven segments, and the seventh segment is the only one available (having been obtained from storage) in a SmartNIC's memory; the solid box around the "7" indicates the segment's data availability, while the dashed boxes represent segment data not yet available. Object 2 has five segments, in which the first and the third segments of Object 2 are available in the SmartNIC's memory. None of the segments have been sent to a client yet; (or sent but not yet acknowledged as having been successfully received and thus remains queued).

Each queue starts with a first segment to be sent to a client. A first segment may be already available in a SmartNIC's memory or may not yet available. A beginning of a queue can be identified as a sequence number of a first segment to be sent to a client (e.g., b1 and b2 in FIG. 5). A queue ends with a last available segment to be sent to a client, that is, the end of a queue can be identified as a sequence number of a last available segment to be sent to a client (e.g., e1 and e2 in FIG. 5).

If the SmartNIC is running low on block memory space, the SmartNIC needs to evict segment(s) from the SmartNIC memory queue by moving them to kernel space. In one or more implementations, the first candidates for moving are those segments that have the longest distances to the beginnings of their queues. In other words, the largest gap (gap1 or gap2) determines the segment that is selected, as such a segment is likely to not be needed as soon as at least one other segment.

In the example of FIG. 5, although the Object 1 queue contains one available segment and the Object 2 queue contains two available segments, the seventh segment of Object 1 has the longest distance to the beginning of its queue; gap1 is greater than gap2. Thus, the seventh segment of Object 1 is selected as the first segment to be copied to kernel space if the SmartNIC's memory runs short. Note that in the event of a tie, any suitable tie-breaking mechanism can be used, e.g., random selection, time-of-request based selection, location in memory based selection, and so on.

Figure 6:
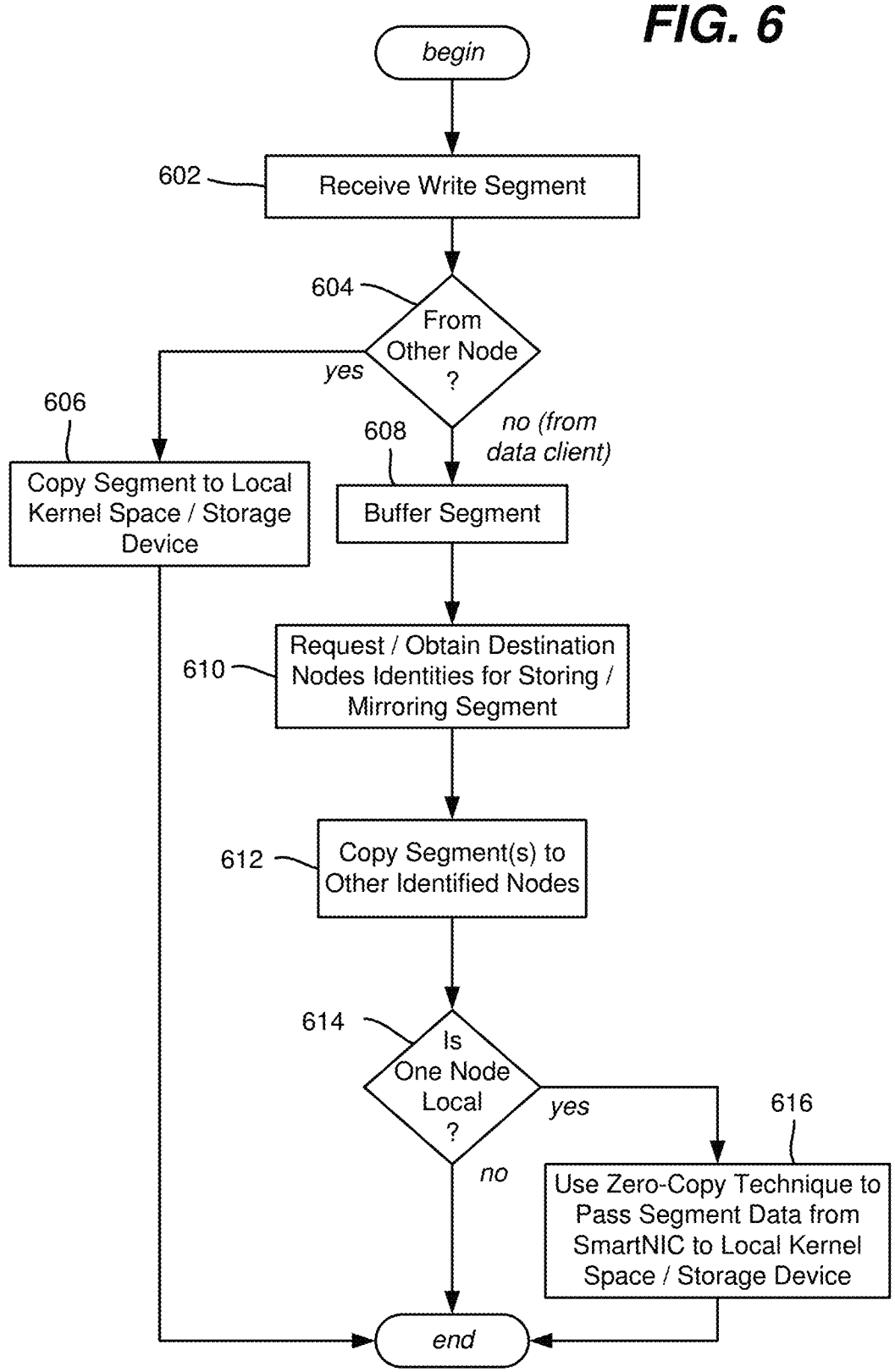
FIG. 6 is a flow diagram showing example operations for handling a data write request at a node with a SmartNIC, in accordance with various aspects and implementations of the subject disclosure.

By way of summary, FIG. 6 shows example operations for handling a write request, beginning at operation 602 where a request to write a segment is received. Operation 604 evaluates whether the segment came from another node, or from a requesting client. If from another node, buffering is not needed, and thus operation 606 directly copies the segment to local kernel space and corresponding storage device as described herein.

If instead operation 604 determines that the request is from a requesting data client, operation 608 buffers the segment. Operation 610 represents requesting that the data service identify the destination nodes for the segment copies, and obtaining the identities of those nodes.

Operation 612 copies the data segments from the SmartNIC memory to the other identified nodes. If one of the destination nodes is also the local node that is handling the write request, as evaluated at operation 614, then operation 616 uses a zero-copy technique to pass the segment data from the SmartNIC memory to the local kernel space/ storage device. These operations can be repeated for each segment until the write request is fully handled.

Figure 7:
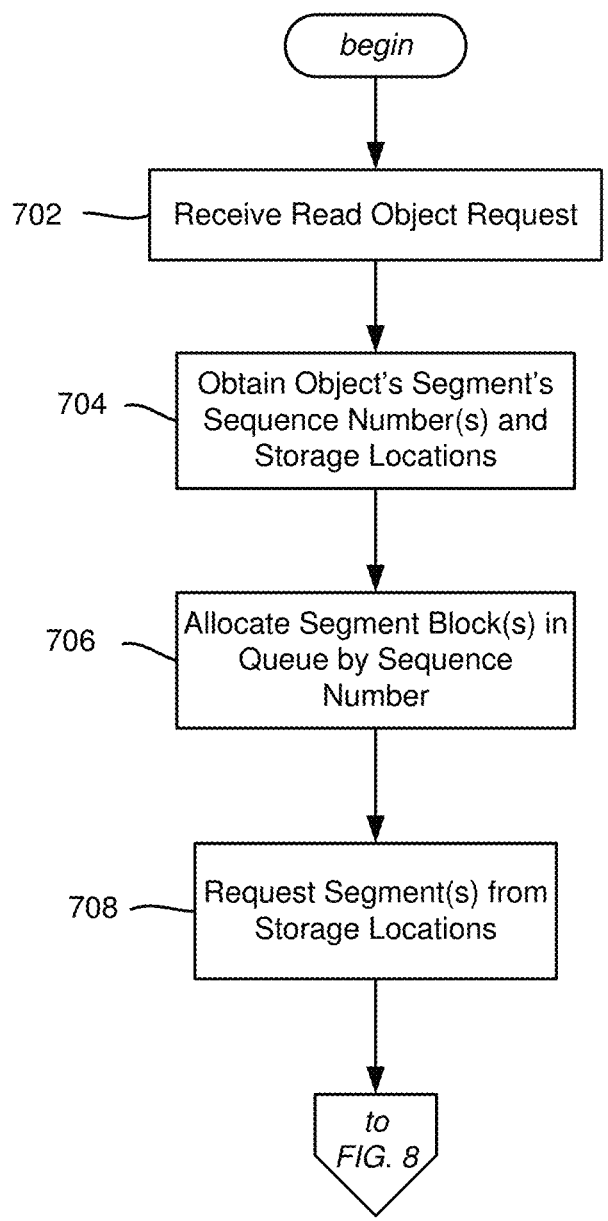
FIGS. 7 and 8 comprise a flow diagram showing example operations for handling a data read request at a node with a SmartNIC, in accordance with various aspects and implementations of the subject disclosure.
Figure 8:
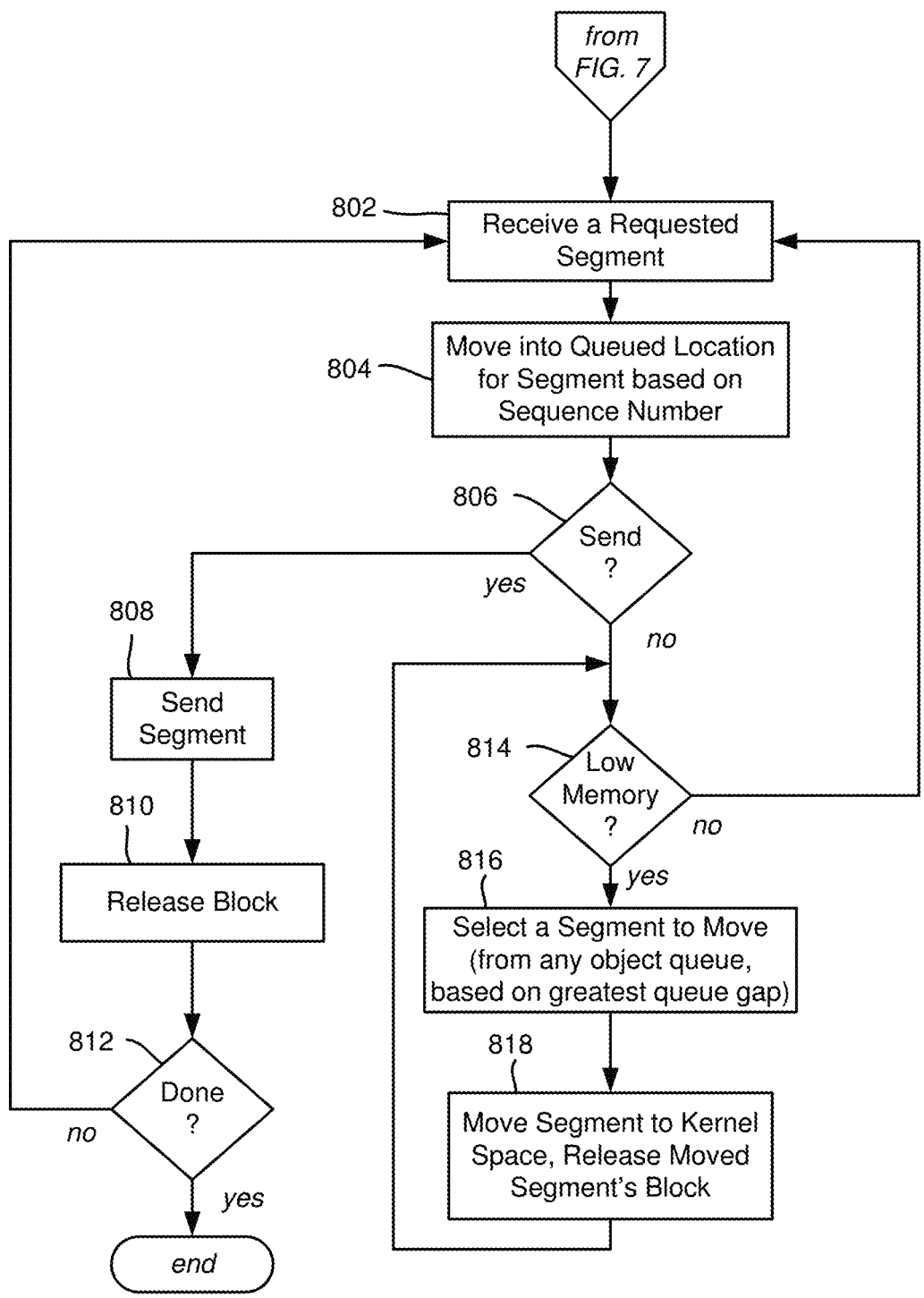

FIGS. 7 and 8 summarize example operations for read request handling, beginning at operation 702 where a read object request is received at a SmartNIC of a node that is to handle the read request. Operation 704 represents obtaining the object's segment's sequence number(s) and associated storage location(s).

Operation 706 represents allocating blocks to form a queue in SmartNIC memory that is arranged by segment sequence number. Note that at this time, consider that there is sufficient space in the SmartNIC memory for the entire queue; (if not, the segments with the lower sequence numbers can be queued in the SmartNIC memory while segments with the larger sequence numbers can be planned for queuing in kernel space. If no space whatsoever is available, then the prior read request handling technique (as used without a SmartNIC) can be employed, although an alternative is to move segments from another object to kernel space, as described herein. In any event, operation 708 requests the segments from their respective storage locations, and continues to operation 802 of FIG. 8.

Operation 802 represents receiving one of the requested segments, which can take some time. As the segments were requested in parallel, they can be received in any order, and thus operation 804 moves the data into its queued location based on its associated sequence number.

Operation 806 evaluates whether the data segment can be sent, that is, whether it is the beginning segment (the first segment, or the next segment in sequence order if one or more previous sends occurred) in the queue. If so, operation 808 sends the segment, and operation 810 releases the block that the segment occupied. Note that operation 810 may not occur until an acknowledgement of a successful communication of the segment data is received from the requesting client.

Operation 812 evaluates whether the request is fully handled, e.g., the entire requested object data has been sent and successfully received. If so, the process ends, otherwise operation 812 returns to operation 802 to continue receiving segments. Note that some operations of FIG. 8 can be performed in parallel or substantially in parallel, e.g., segments can be received and queued while waiting for a send operation to be acknowledged (or negatively acknowledged, causing a retry) by the client.

Returning to operation 806, consider that a segment is received that cannot be sent yet, e.g., it has a greater sequence number than the last sent segment (if any). The queueing of this segment can cause a low memory condition (e.g., the use threshold value to be reached), as evaluated at operation 814; (note that other requested objects can be having their segments queued via parallel instances of operation 804, and thus a SmartNICs memory space allocated for segment blocks can be quickly drained). If not a low memory condition, the process returns to operation 802 (and waits as needed) for another segment to be received.

If a low memory condition is detected at operation 814, then a segment needs to be moved to kernel space as described herein. Operation 816 selects a segment to move to kernel space, which occurs at operation 818, which also represents freeing the segment's block space for another segment's data. Note that the selected segment is not necessarily from the same object for which segments are being received; selection of the segment can be based on the greatest gap from the segment to the beginning of its queue among all object queues, as described above. The moving of segments can be repeated until sufficient space is available, possibly using a different percentage (e.g., move starting at ninety percent usage until eighty-eight percent usage is achieved).

Figure 9:
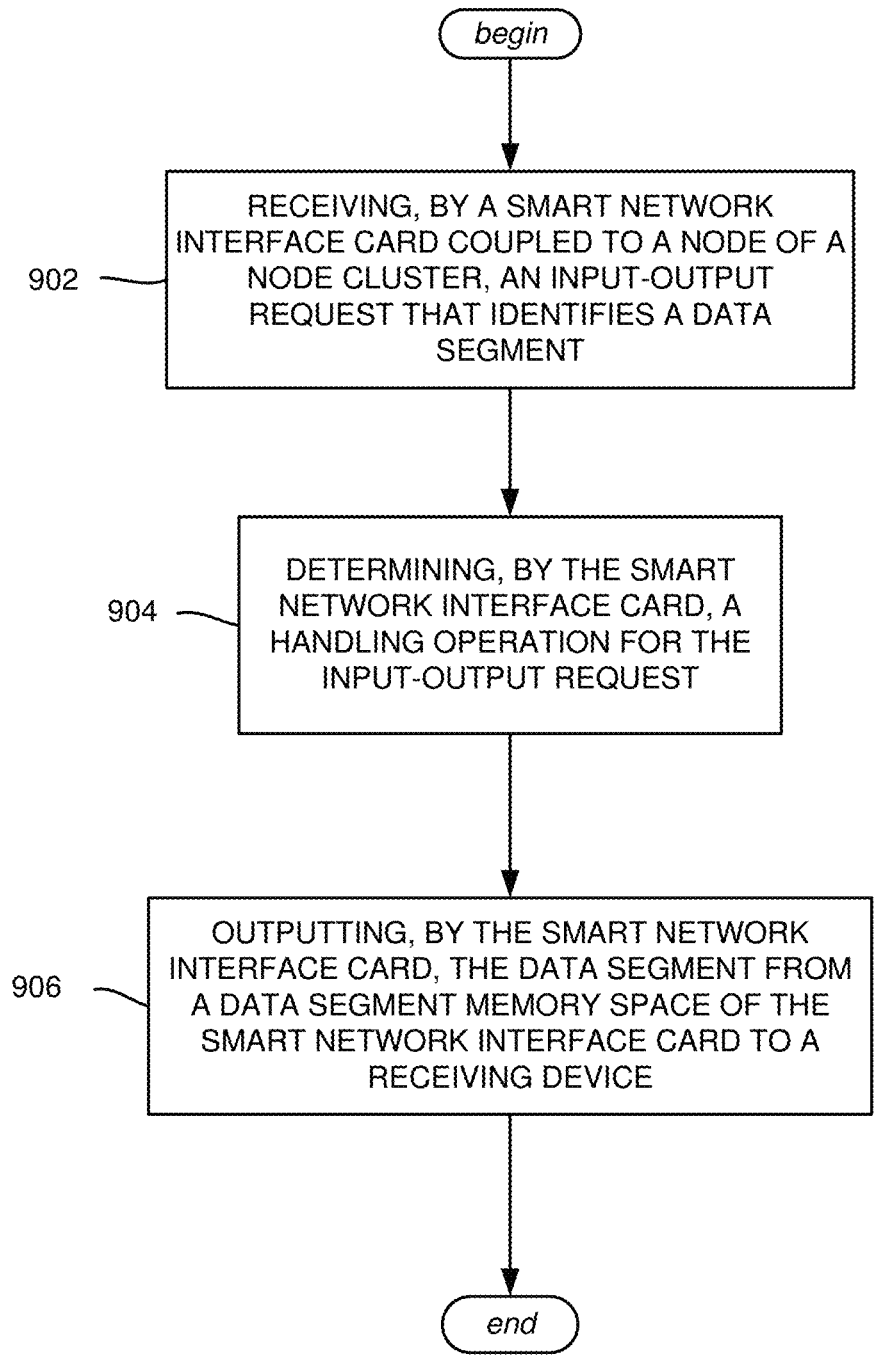
FIG. 9 is a flow diagram showing example operations related to handling an I/O request received at a SmartNIC, in accordance with various aspects and implementations of the subject disclosure.

One or more aspects, generally exemplified in FIG. 9, can comprise example operations, e.g., of a method. Operation 902 represents receiving, by a smart network interface card coupled to a node of a node cluster, an input-output request that identifies a data segment. Operation 904 represents determining, by the smart network interface card, a handling operation for the input-output request. Operation 906 represents outputting, by the smart network interface card, the data segment from a data segment memory space of the smart network interface card to a receiving device.

Aspects can comprise, in response to the receiving the input-output request that identifies the data segment, allocating a portion of available memory of the smart network interface card to a data segment memory space for the data segment, receiving an indication that the outputting the data segment to the receiving device was successful, and deallocating the data segment memory space in response to the receiving the indication.

The input-output request that identifies a data segment can comprise a descriptor, and aspects can comprise providing the descriptor from the smart network interface card to a storage service in the node to which the smart network interface card is coupled, and obtaining information by the smart network interface card from the storage service that identifies the receiving device.

The data segment can comprise a first data segment, the data segment memory space can comprise a first data segment memory space of the smart network interface card, and the input-output request can comprise a write request corresponding to the first data segment and a second data segment; aspects can comprise queuing the first data segment in the first data segment memory space and queuing the second data segment in a second data segment memory space of the smart network interface card.

The node to which the smart network interface card is coupled can comprise a first node, the input-output request can comprise a write request, and outputting the data segment from the memory of the smart network interface card to the receiving device can comprise determining a second node of the node cluster to which the data segment dataset is to be copied, and sending the data segment to the second node of the node cluster.

The input-output request can comprise a write request, and outputting the data segment from the memory of the smart network interface card to the receiving device can comprise determining that the node of the node cluster to which the smart network interface card is coupled is to maintain a copy of the data segment, and sending the data segment dataset to a kernel space of the node.

The node to which the smart network interface card is coupled can comprise a first node, the input-output request can comprise a write request, and outputting the data segment from the memory of the smart network interface card to the receiving device can comprise determining mirroring nodes of the node cluster to which the data segment dataset is to be copied, and sending the data segment to the mirroring nodes of the node cluster.

The node to which the smart network interface card is coupled can comprise a first node, the input-output request can comprise a write request, and outputting the data segment from the memory of the smart network interface card to the receiving device can comprise determining that the node of the node cluster to which the smart network interface card is coupled is to maintain a copy of the data segment, determining a second mirroring node and a third mirroring node of the node cluster to which the data segment dataset is to be copied, sending the data segment dataset to a kernel space of the first node, and sending the data segment to the second node and the third node.

The input-output request can comprise a read request from a client device associated with a descriptor that identifies the data segment, aspects can comprise providing the descriptor from the smart network interface card to a storage service in the node to which the smart network interface card is coupled, obtaining information at the smart network interface card from the storage service that identifies a cluster node that maintains the data segment, and obtaining the data segment from the node of the node cluster that maintains the data segment.

The data segment can comprise a first data segment of an object that comprises the first data segment and a second data segment, the data segment memory space can comprise first data segment memory space, the input-output request can comprise a read request from a client device associated with a first descriptor that identifies the first data segment and a second descriptor that identifies the second data segment; aspects can comprise providing the first descriptor and the second descriptor from the smart network interface card to a storage service in the node to which the smart network interface card is coupled, obtaining information at the smart network interface card from the storage service that identifies a first cluster node that maintains the first data segment, identifies a first sequence number of the first data segment, identifies a second cluster node that maintains the second data segment, and identifies a second sequence number of the second data segment, obtaining the first data segment from the first cluster node and storing the first data segment in the first data segment memory space, obtaining the second data segment from the second cluster node and storing the second data segment in the second data segment memory space and sorting the first data segment and the second data segment based on the first sequence number relative to the second sequence number into ordered object parts in a queue; outputting the data segment from the data segment memory space can comprise sending the ordered object parts from the queue to the client device.

Aspects can comprise moving a third data segment from a third data segment memory space to a kernel space to free memory in the smart network interface card for the second data memory space. Aspects can comprise selecting the third data segment memory space based on a distance from the third data segment memory space within the queue to a start of the queue. Aspects can comprise selecting the third data segment memory space based on a distance from the third data segment memory space within another queue to a start of the other queue.

Figure 10:
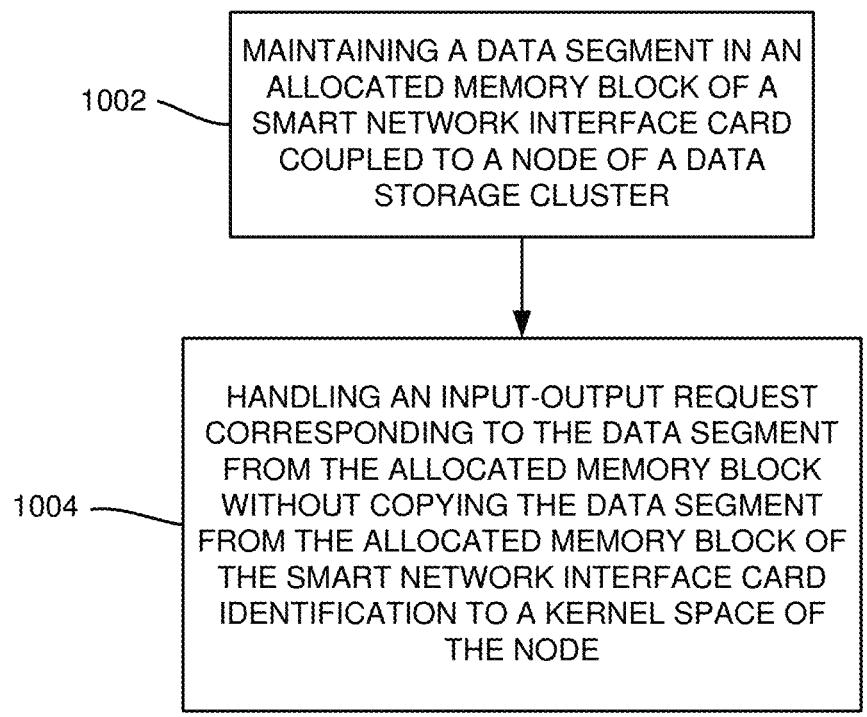
FIG. 10 is a diagram showing example operations related to handling an I/O request received at a SmartNIC coupled to a node without using kernel space of the node, in accordance with various aspects and implementations of the subject disclosure.

One or more aspects are represented in FIG. 10, such a corresponding to a system, comprising a processor and a memory that stores executable instructions that, when executed by the processor, facilitate performance of operations. Example operations can comprise maintaining a data segment in an allocated memory block of a smart network interface card coupled to a node of a data storage cluster (operation 1002), and handling an input-output request corresponding to the data segment from the allocated memory block without copying the data segment from the allocated memory block of the smart network interface card identification to a kernel space of the node (operation 1004).

The input-output request can comprise a write request to write the data segment to the data storage cluster, and handling of the input-output request can comprise determining mirroring nodes of the data storage cluster, and copying the data segment to the mirroring nodes of the data storage cluster.

The input-output request can comprise a read request from a client device to read the data segment from the data storage cluster as part of an object read request corresponding to the data segment and one or more other data segments, and handling of the input-output request can comprise queuing the data segment and the one or more other data segments in an ordered queue, in which the queuing is logically ordered based on sequence numbers associated with the data segment and the one or more other data segments, and sending data from the ordered queue to the client device. Aspects can comprise moving a selected data segment to a memory location external to the smart network interface card to free up memory space in the network interface card for the ordered queue.

Figure 11:
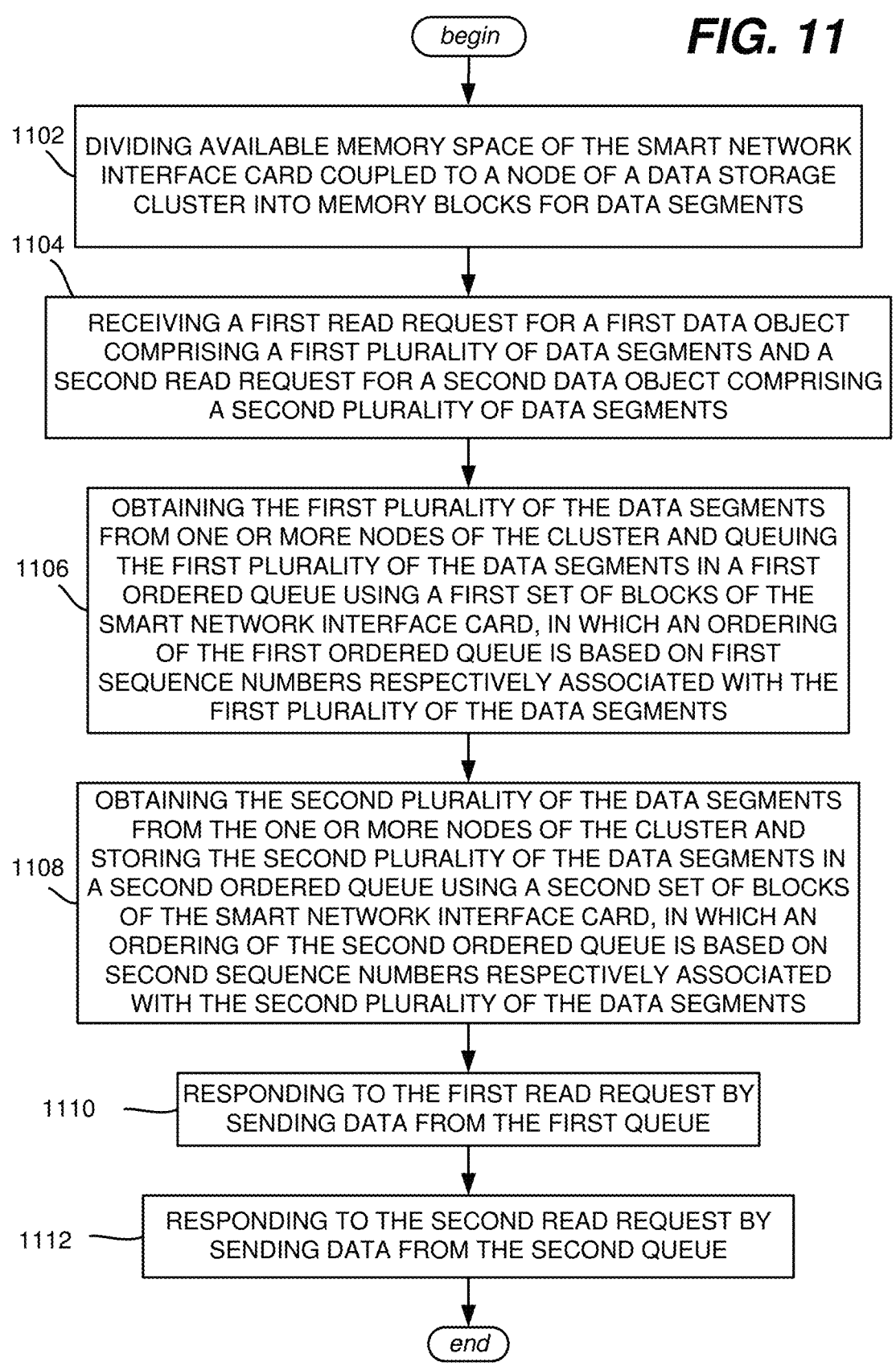
FIG. 11 is a flow diagram showing example operations related to related to handling read requests received at a SmartNIC, in accordance with various aspects and implementations of the subject disclosure.

One or more aspects, such as implemented in a machine-readable storage medium, comprising executable instructions that, when executed by a processor (e.g., of a smart network interface card), facilitate performance of operations, can be directed towards operations exemplified in FIG. 11. Example operation 1102 represents dividing available memory space of the smart network interface card coupled to a node of a data storage cluster into memory blocks for data segments. Operation 1104 represents receiving a first read request for a first data object comprising a first plurality of data segments and a second read request for a second data object comprising a second plurality of data segments. Operation 1106 represents obtaining the first plurality of the data segments from one or more nodes of the cluster and queuing the first plurality of the data segments in a first ordered queue using a first set of blocks of the smart network interface card, in which an ordering of the first ordered queue is based on first sequence numbers respectively associated with the first plurality of the data segments. Operation 1108 represents obtaining the second plurality of the data segments from the one or more nodes of the cluster and storing the second plurality of the data segments in a second ordered queue using a second set of blocks of the smart network interface card, in which an ordering of the second ordered queue is based on second sequence numbers respectively associated with the second plurality of the data segments. Operation 1110 represents responding to the first read request by sending data from the first queue, and operation 1112 represents responding to the second read request by sending data from the second queue.

Aspects can comprise, in response to determining that there is an insufficient number of blocks for the first ordered queue and the second ordered queue relative to a threshold value, moving a data segment from a selected block of the smart network interface card to other storage of the node to which the smart network interface card is coupled. Aspects can comprise selecting the selected block based on a largest gap in sequence numbers corresponding to a first gap and a second gap, wherein the first gap is between a first current starting sequence number of the first sequence numbers of the first ordered queue to a first end sequence number of the first sequence numbers of a first last available data segment in the first ordered queue, and the second gap is between a second current starting sequence number of the second sequence numbers of the second ordered queue to a second end sequence number of the second sequence numbers of a second last available data segment in the second ordered queue.

As can be seen, described herein is a technology that accelerates data handling in a cloud data storage system of nodes by the use of SmartNICs. By having SmartNICs retain and output information directly from SmartNIC memory, many of the copy operations to node kernel space can be eliminated.

Figure 12:
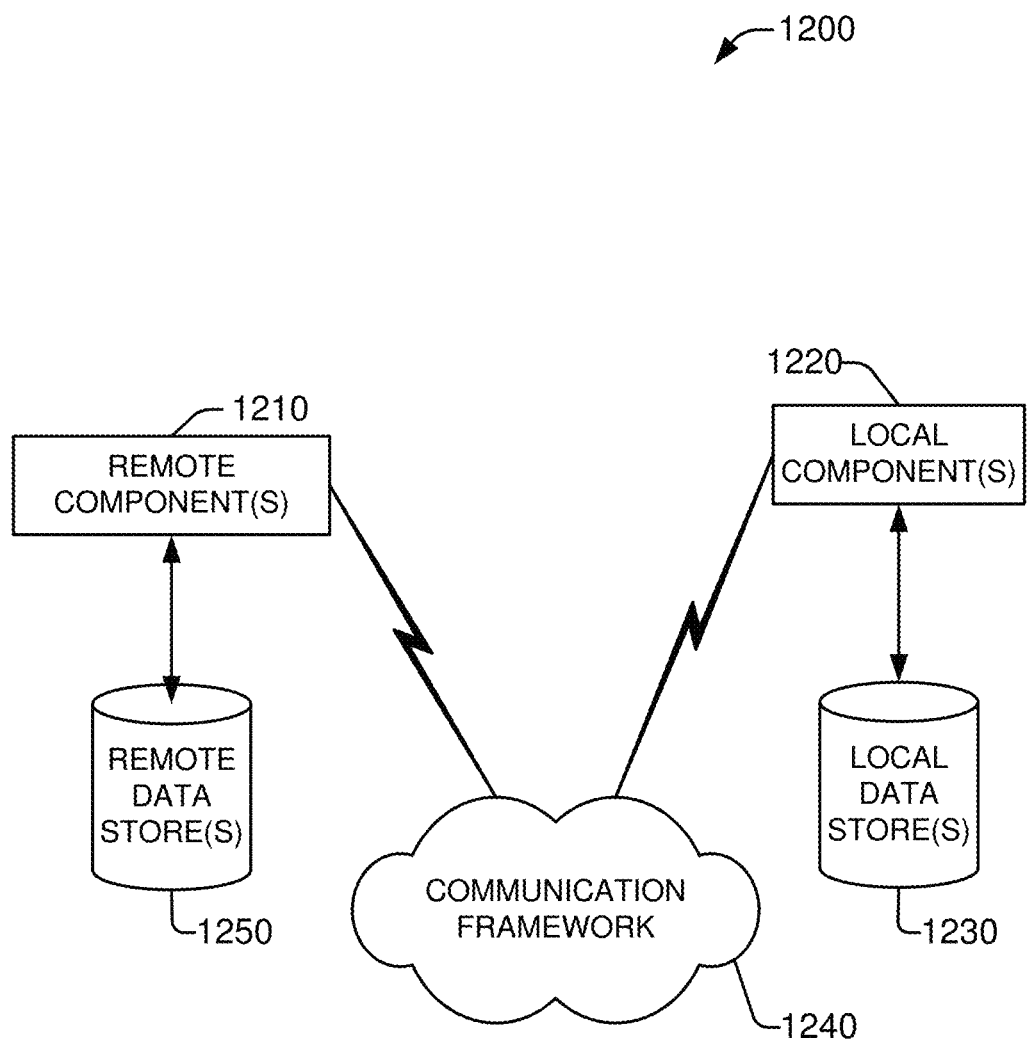
FIG. 12 depicts an example schematic block diagram of a computing environment with which the disclosed subject matter can interact, in accordance with various aspects and implementations of the subject disclosure.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
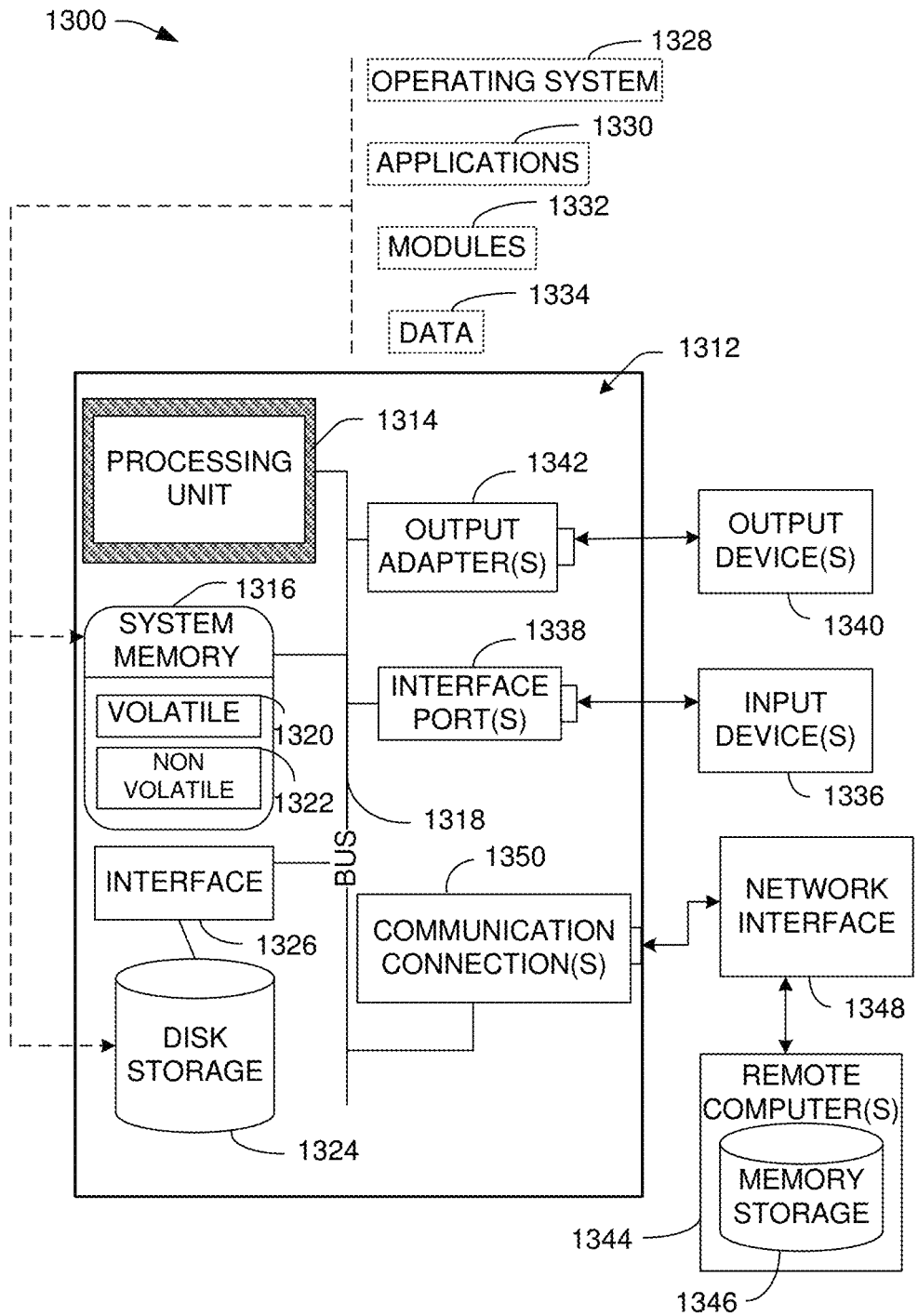
FIG. 13 illustrates an example block diagram of a computing system operable to execute the disclosed systems and methods in accordance with various aspects and implementations of the subject disclosure.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1320 (see below), nonvolatile memory 1322 (see below), disk storage 1324 (see below), and memory storage 1346 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with one or more embodiments/implementations described herein. Computer 1312, can comprise a processing unit 1314, a system memory 1316, and a system bus 1318. System bus 1318 couples system components comprising, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 1316 can comprise volatile memory 1320 and nonvolatile memory 1322. A basic input/output system, containing routines to transfer information between elements within computer 1312, such as during start-up, can be stored in nonvolatile memory 1322. By way of illustration, and not limitation, nonvolatile memory 1322 can comprise read only memory, programmable read only memory, electrically programmable read only memory, electrically erasable read only memory, or flash memory. Volatile memory 1320 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1312 can also comprise removable/non-removable, volatile/non-volatile computer storage media. FIG. 13 illustrates, for example, disk storage 1324. Disk storage 1324 comprises, but is not limited to, devices like a magnetic disk drive, floppy disk drive, tape drive, flash memory card, or memory stick. In addition, disk storage 1324 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1324 to system bus 1318, a removable or non-removable interface is typically used, such as interface 1326.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software comprises an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1312. Input devices 1336 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 comprise, for example, a serial port, a parallel port, a game port, a universal serial bus, an infrared port, a Bluetooth port, an IP port, or a logical port associated with a wireless service, etc. Output device(s) 1340 use some of the same type of ports as input device(s) 1336.

Thus, for example, a universal serial busport can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 comprise, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1312. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising,
receiving, by a smart network interface card coupled to a node of a node cluster, an input-output request that identifies a data segment;
allocating a portion of available memory of the smart network interface card to a data segment memory space for the data segment;
determining, by the smart network interface card, a handling operation for the input-output request;
outputting, by the smart network interface card, the data segment from the data segment memory space of the smart network interface card to a receiving device;
receiving an indication that the outputting the data segment to the receiving device was successful; and
deallocating the data segment memory space in response to the receiving the indication.

2. The method of claim 1, wherein the allocating the portion of available memory of the smart network interface card to the data segment memory space for the data segment in performed in response to the receiving the input-output request that identifies the data segment.

3. The method of claim 1, wherein the input-output request that identifies a data segment comprises a descriptor, and further comprising, providing the descriptor from the smart network interface card to a storage service in the node to which the smart network interface card is coupled, and obtaining information by the smart network interface card from the storage service that identifies the receiving device.

4. The method of claim 1, wherein the data segment is a first data segment, wherein the data segment memory space is a first data segment memory space of the smart network interface card, wherein the input-output request comprises a write request corresponding to the first data segment and a second data segment, and further comprising, queuing the first data segment in the first data segment memory space and queuing the second data segment in a second data segment memory space of the smart network interface card.

5. The method of claim 1, wherein the node to which the smart network interface card is coupled comprises a first node, wherein the input-output request comprises a write request, and wherein the outputting the data segment from the data segment memory space of the smart network interface card to the receiving device comprises determining a second node of the node cluster to which the data segment is to be copied, and sending the data segment to the second node of the node cluster.

6. The method of claim 1, wherein the input-output request comprises a write request, and wherein the outputting the data segment from the data segment memory space of the smart network interface card to the receiving device comprises determining that the node of the node cluster to which the network interface card is coupled is to maintain a copy of the data segment, and sending the data segment to a kernel space of the node.

7. The method of claim 1, wherein the node to which the smart network interface card is coupled comprises a first node, wherein the input-output request comprises a write request, and wherein the outputting the data segment from the data segment memory space of the smart network interface card to the receiving device comprises determining mirroring nodes of the node cluster to which the data segment is to be copied, and sending the data segment to the mirroring nodes of the node cluster.

8. The method of claim 1, wherein the node to which the smart network interface card is coupled comprises a first node, wherein the input-output request comprises a write request, and wherein the outputting the data segment from the data segment memory space of the smart network interface card to the receiving device comprises determining that the node of the node cluster to which the network interface card is coupled is to maintain a copy of the data segment, determining a second mirroring node and a third mirroring node of the node cluster to which the data segment is to be copied, sending the data segment to a kernel space of the first node, and sending the data segment to the second node and the third node.

9. The method of claim 1, wherein the input-output request comprises a read request from a client device associated with a descriptor that identifies the data segment, and further comprising, providing the descriptor from the smart network interface card to a storage service in the node to which the smart network interface card is coupled, obtaining information at the smart network interface card from the storage service that identifies a cluster node that maintains the data segment, and obtaining the data segment from the node of the node cluster that maintains the data segment.

10. The method of claim 1, wherein the data segment is a first data segment of an object that comprises the first data segment and a second data segment, wherein the data segment memory space is first data segment memory space, wherein the input-output request comprises a read request from a client device associated with a first descriptor that identifies the first data segment and a second descriptor that identifies the second data segment, and further comprising,
providing the first descriptor and the second descriptor from the smart network interface card to a storage service in the node to which the smart network interface card is coupled, obtaining information at the smart network interface card from the storage service that identifies a first cluster node that maintains the first data segment, identifies a first sequence number of the first data segment, identifies a second cluster node that maintains the second data segment, and identifies a second sequence number of the second data segment,
obtaining the first data segment from the first cluster node and storing the first data segment in the first data segment memory space;
obtaining the second data segment from the second cluster node and storing the second data segment in a second data segment memory space; and
sorting the first data segment and the second data segment based on the first sequence number relative to the second sequence number into ordered object parts in a queue,
wherein the outputting the data segment from the data segment memory comprises sending the ordered object parts from the queue to the client device.

11. The method of claim 10, further comprising, moving a third data segment from a third data segment memory space to a kernel space to free memory in the smart network interface card for the second data segment memory space.

12. The method of claim 11, further comprising, selecting the third data segment memory space based on a distance from the third data segment memory space within the queue to a start of the queue.

13. The method of claim 11, further comprising, selecting the third data segment memory space based on a distance from the third data segment memory space within another queue to a start of the other queue.

14. The method of claim 1, wherein the input-output request comprises a write request to write the data segment to the data storage cluster, and wherein the handling of the input-output request comprises determining mirroring nodes of the node cluster, and copying the data segment to the mirroring nodes of the data storage cluster.

15. A system, comprising:
a processor; and
a memory that stores executable instructions that, when executed by the processor, facilitate performance of operations, the operations comprising:
maintaining a data segment in an allocated memory block of a smart network interface card coupled to a node of a data storage cluster; and
handling an input-output request corresponding to the data segment from the allocated memory block without copying the data segment from the allocated memory block of the smart network interface card identification to a kernel space of the node, wherein the input output request comprises a write request to write the data segment to the data storage cluster, and wherein the handling of the input-output request comprises determining mirroring nodes of the data storage cluster, and copying the data segment to the mirroring nodes of the data storage cluster.

16. The system of claim 15, wherein the input output request comprises a read request from a client device to read the data segment from the data storage cluster as part of an object read request corresponding to the data segment and one or more other data segments, and wherein the handling of the input-output request comprises, queuing the data segment and the one or more other data segments in an ordered queue, in which the queuing is logically ordered based on sequence numbers associated with the data segment and the one or more other data segments, and sending data from the ordered queue to the client device.

17. The system of claim 16, wherein the operations further comprise, moving a selected data segment to a memory location external to the network interface card to free up memory space in the network interface card for the ordered queue.

18. A non-transitory machine-readable storage medium, comprising executable instructions that, when executed by a processor of a smart network interface card, facilitate performance of operations, the operations comprising:
dividing available memory space of the smart network interface card coupled to a node of a data storage cluster into memory blocks for data segments;
receiving a first read request for a first data object comprising a first plurality of data segments and a second read request for a second data object comprising a second plurality of data segments;
obtaining the first plurality of the data segments from one or more nodes of the cluster and queuing the first plurality of the data segments in a first ordered queue using a first set of blocks of the smart network interface card, in which an ordering of the first ordered queue is based on first sequence numbers respectively associated with the first plurality of the data segments;
obtaining the second plurality of the data segments from the one or more nodes of the cluster and storing the second plurality of the data segments in a second ordered queue using a second set of blocks of the smart network interface card, in which an ordering of the second ordered queue is based on second sequence numbers respectively associated with the second plurality of the data segments;
responding to the first read request by sending data from the first queue; and
responding to the second read request by sending data from the second queue.

19. The non-transitory machine-readable storage medium of claim 18, wherein the operations further comprise, in response to determining that there is an insufficient number of blocks for the first ordered queue and the second ordered queue relative to a threshold value, moving a data segment from a selected block of the smart network interface card to other storage of the node to which the network interface card is coupled.

20. The non-transitory machine-readable storage medium of claim 18, wherein the operations further comprise selecting the selected block based on a largest gap in sequence numbers corresponding to a first gap and a second gap, wherein the first gap is between a first current starting sequence number of the first sequence numbers of the first ordered queue to a first end sequence number of the first sequence numbers of a first last available data segment in the first ordered queue, and the second gap is between a second current starting sequence number of the second sequence numbers of the second ordered queue to a second end sequence number of the second sequence numbers of a second last available data segment in the second ordered queue.

* * * * *